March 25, 1952  H. C. RHODES  2,590,823
AUTOMATIC DOUGH PANNING MACHINE
Filed July 7, 1949  3 Sheets-Sheet 1

INVENTOR.
HERBERT C RHODES
BY
Otto Moeller
ATTORNEY

March 25, 1952 H. C. RHODES 2,590,823
AUTOMATIC DOUGH PANNING MACHINE
Filed July 7, 1949 3 Sheets-Sheet 2
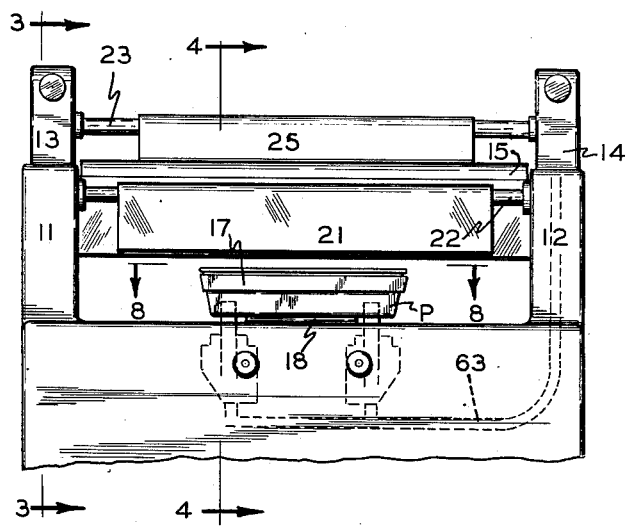
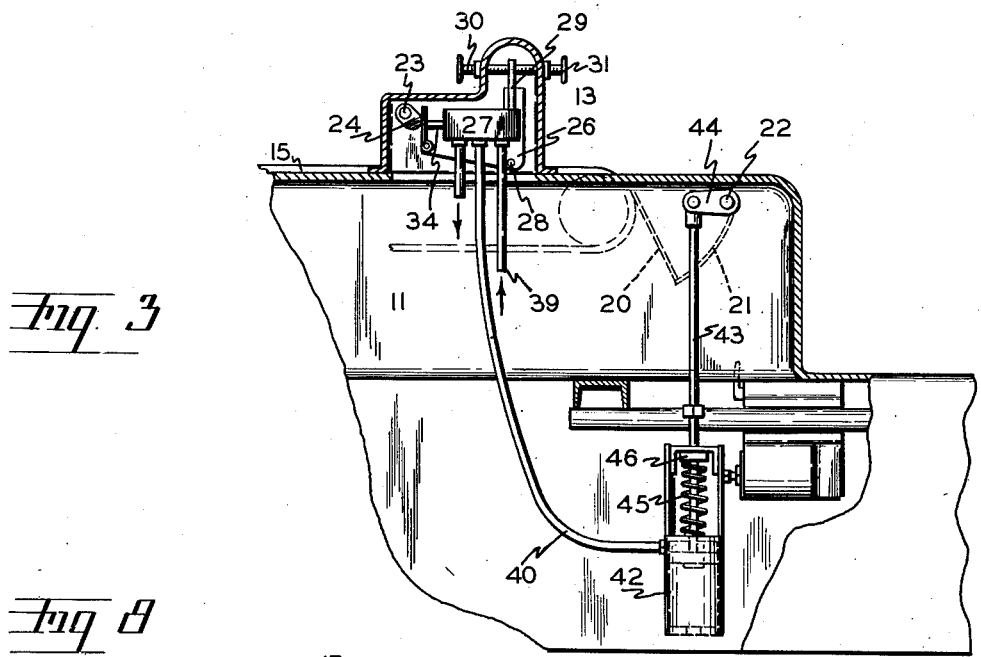
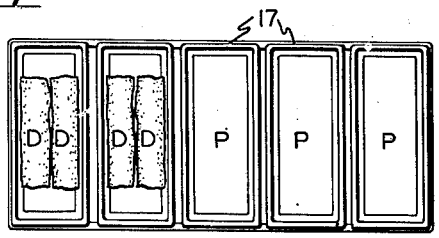
INVENTOR.
HERBERT C RHODES
BY
*Otto Moeller*
ATTORNEY March 25, 1952  H. C. RHODES  2,590,823
AUTOMATIC DOUGH PANNING MACHINE
Filed July 7, 1949  3 Sheets-Sheet 3
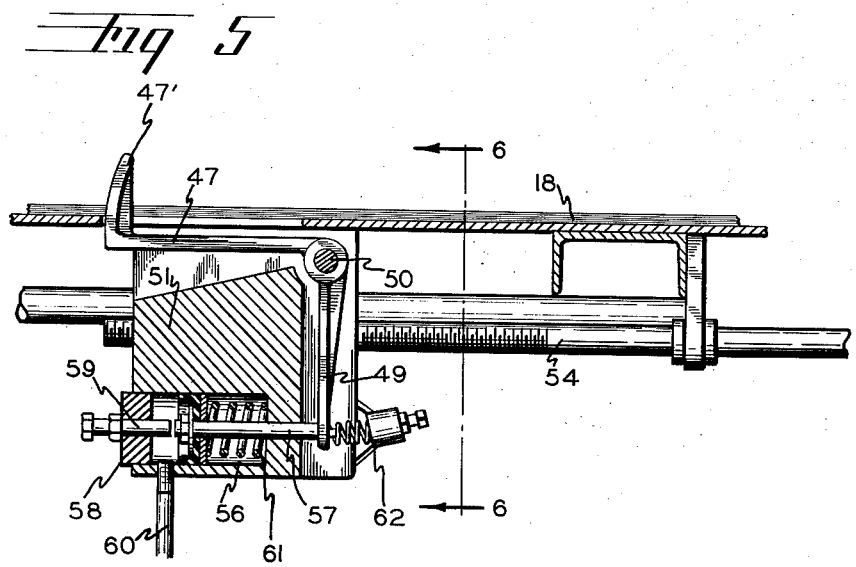
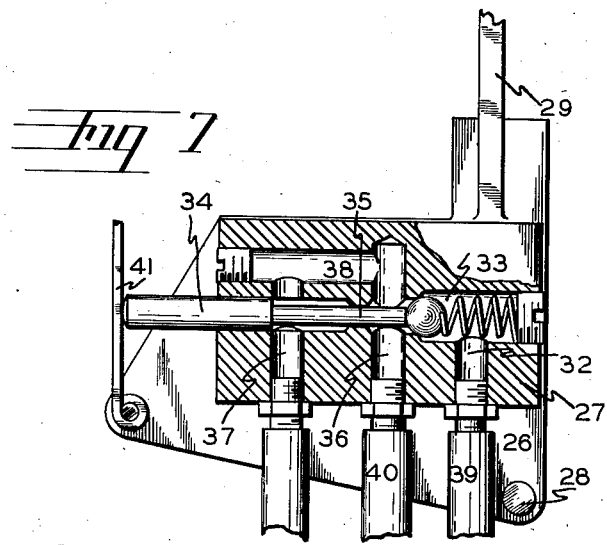
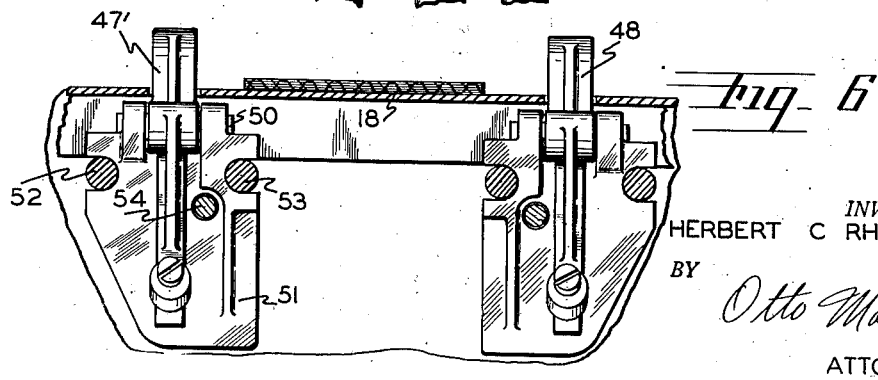
INVENTOR.
HERBERT C RHODES
BY
Otto Moeller
ATTORNEY Patented Mar. 25, 1952

2,590,823

UNITED STATES PATENT OFFICE 2,590,823

AUTOMATIC DOUGH PANNING MACHINE

Herbert C. Rhodes, Portland, Oreg., assignor to Read Standard Corporation, a corporation of Delaware Application July 7, 1949, Serial No. 103,338

7 Claims. (Cl. 226—2)

This invention relates in general to machines in which dough is molded and fed into pans for baking, and, more specifically, relates to means by which the molded pieces or lumps of dough will be separately and automatically placed in the baking pans preparatory to the delivery of the pans to the baking ovens.

Where the mixing and handling of the dough is done by machine it is customary to have molded pieces of dough delivered consecutively, for example, from an endless conveyor belt, into baking pans, while the pans also are moved by suitable conveyor means so that each pan will be placed in position for having the desired amount of dough deposited therein and thence moved on while its place is taken by the next consecutive empty pan.

One of the objects of the present invention is to provide improved means for delivering pieces of dough into the pans consecutively, for automatically positioning each pan to receive its amount of dough, for holding the pan temporarily in such position while the dough is being deposited in the pan, and then causing the dough filled pan to be moved on.

In bread making the bread may be baked either in the form of single loaves, that is to say with one piece of dough in each baking pan, or also in the familiar "double" loaves in which two pieces of dough are placed side by side in the same baking pan.

It is a further object of the present invention to provide improved pan-loading means whereby either a single piece of dough will be placed in each pan or, when desired, by slight adjusting of the means, two pieces of dough will be similarly caused to be placed side by side in each pan, the delivery and placing of the dough pieces in both cases taking place automatically.

A further object of this invention is to provide an improved automatic pan loader for use for single or "double" loaves which will be simple in construction and practical and convenient to operate and maintain.

I attain these particular objects, as well as other advantages, through my improved dough pan loader with the various parts constructed and arranged and functioning substantially as hereinafter briefly described, reference being made to the accompanying drawings in which:

Fig. 2 is an elevation of the machine of Fig. 1 taken from the right in Fig. 1, the pan controlling means being indicated by broken lines;

Fig. 3 is a fragmentary sectional elevation taken on line 3—3 of Fig. 2 but drawn to a larger scale;

Fig. 5 is a sectional elevation on a larger scale of part of the same mechanism shown in Fig. 4;

Fig. 6 is a view taken on line 6—6 of Fig. 5;

Fig. 7 is a sectional elevation showing the details of one of the pair of air valve control assemblies employed in my device, the valve control assembly of this figure corresponding to that shown in Fig. 3; and Fig. 8 is a plan view of a set of bread pans adapted for receiving the pieces of dough, the plan view being taken on lines 8—8 of Figs. 2 and 4.

Figure 1:
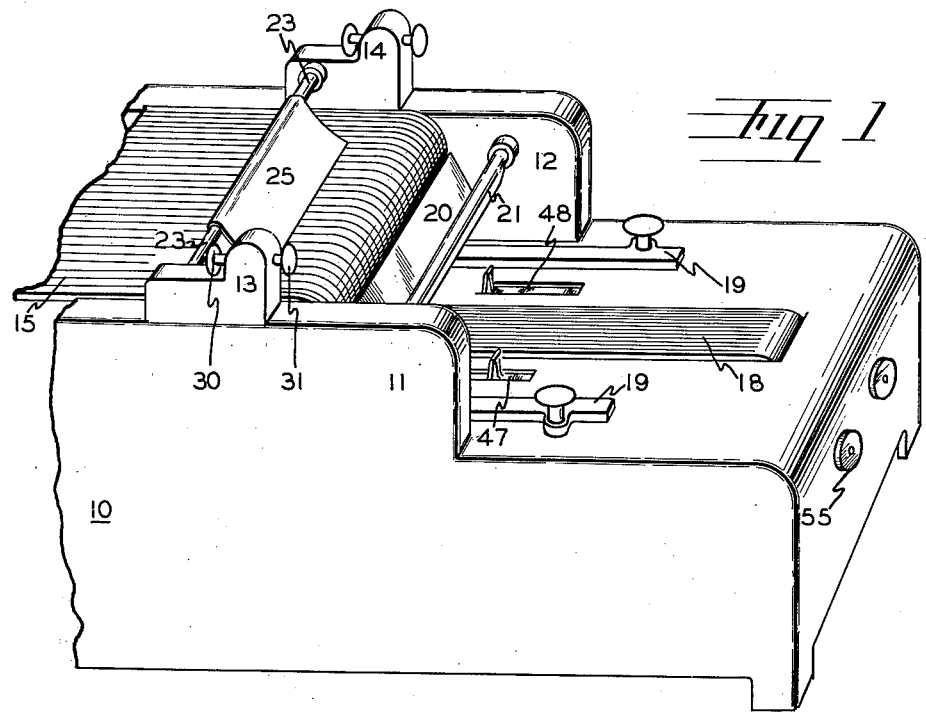
Fig. 1 is a perspective view of the end portion of a dough delivering machine with my automatic pan loader installed therein.

Referring first to Fig. 1, my dough pan loader is installed in the discharging end portion of a dough delivery machine which is indicated in general by the reference character 10. Hollow side wall housings 11 and 12 are located at opposite sides in the upper portion of the dough delivery machine and terminate short of the end of the machine. An endless belt 15, passing over an end roller 16 (shown in Fig. 4), and driven by suitable means (not shown), carries the separate pieces of dough D from the dough molding rolls (not shown) to the right, as viewed in Figs. 1 and 4, for delivery to the baking pans P.

The baking pans P, which are customarily arranged in sets with the pans of each set secured together in parallel spaced relationship within a frame 17 (Figs. 4 and 8), are moved along (from left to right as viewed in Figs. 1 and 4) on an endless traveling belt 18 in the usual manner. Longitudinally-extending side guide rails 19 (Fig. 1) keep the sets of pans positioned on the traveling belt 18, the guide rails 19 preferably being adjustably mounted to accommodate pans of different lengths. This general arrangement of having the baking pans moved along on a traveling belt or conveyor and having the pieces of dough carried on a traveling belt positioned above and parallel to the pan belt, but terminating short of the pan belt so that the pieces of dough at the end of their travel on the upper belt can drop down into the pans on the lower belt, is well known and common to machines of this type.

However, instead of having the pieces of dough D drop directly from the belt 15 into the pans P, I have found it more desirable for the pieces of dough to be deposited first into a trough-like dispenser located just beyond and below the belt 15, and then, after momentarily being held in such dispenser, to be deposited from the dispenser into the pans. This arrangement has the two-fold advantage of breaking the fall of the pieces of dough from the upper belt down into the pans and of enabling the depositing and positioning of the dough in the pans to be more accurately controlled. Such a trough-like dispenser into which each piece of dough first passes when dropping from the conveyor belt 15 is composed of a stationary plate 20 (Figs. 1 and 4), supported between the opposite inner walls of the side housings 11 and 12, and a cooperating hinged plate 21 secured to a shaft 22. The ends of the shaft 22 are rotatably supported in the housings 11 and 12. The manner in which the dispenser operates and the means by which its operation is automatically controlled will now be briefly explained.

A pair of identical housings 13 and 14 (Figs. 1 and 2) are located above the side wall housings 11 and 12 respectively in transverse alignment with each other. An identical air valve control assembly is located in each of the housings 13 and 14. A shaft 23 has its ends rotatably supported in the housings 13 and 14 respectively. A cam member is secured to each end of the shaft 23 within these housings. One of these cam members is shown at 24 in Fig. 3. A dough-engageable trip plate 25 (Figs. 1, 2 and 4) rigidly attached to the shaft 23 is so arranged as to be lifted whenever it is encountered by a piece of dough moving with the traveling belt 15. Thus as a piece of dough moves under the trip plate 25 the lifting of the trip plate will cause a partial rotation of the shaft 23 in one direction and the dropping of the trip plate when the piece of dough has passed beyond the trip plate will cause corresponding partial rotation of the shaft 23 in the opposite direction. The trip plate 25 is formed of any suitable metal or plastic and the bottom is preferably curved in the direction of travel of the dough so as to facilitate the sliding of the dough under the free end of the trip plate as the free end rests on the dough.

The air valve assembly, which is located within the housing 13, includes a vertical mounting plate 26 (Figs. 3 and 7) which carries a block 27. The plate 26 and block 27 are supported on a pivot pin 28 and the plate 26 has an upstanding top arm 29 which is held between a pair of adjusting screws 30 and 31 (Fig. 3). Thus the plate 26 can be raised slightly upwardly or downwardly in its vertical plane by adjustment of the screws 30 and 31. The block 27 is bored to provide inlet and outlet channels and a valve chamber as shown in Fig. 7. Thus an inlet channel 32 connects with a valve chamber 33 in which the customary ball valve and spring are located as illustrated. A valve-operating piston 34, slidable in a piston chamber, has an inner stem 35 of reduced diameter which engages the ball valve. The outer end of the piston 34 extends beyond the block 27. A channel 36 which crosses the piston channel and is thereby connected with the valve chamber 33, is connected to an exhaust port channel 37 by an intermediate channel 38. The exhaust port channel 37 also crosses the piston channel. The inlet channel 32 is connected by a flexible tube 39 to a suitable source of compressed air (not shown). The channel 36 is connected by means of a flexible tube 40 (see also Fig. 3) to a cylinder having a pneumatically-operated piston, to be described later, which in turn is connected with the hinged plate 21 of the trough-like dispenser.

As apparent from Fig. 7, movement of the piston 34 to the right a short distance will open the ball valve in chamber 33 and permit air under pressure delivered through tube 39 to pass into channel 36 and tube 40. At the same time the exhaust channel 37 will be closed by the piston 34. Similarly the return of the piston 34 to the left to the normal position shown in Fig. 7, will cause the ball valve to close and will then permit air to pass in the reverse direction through the tube 40 and channel 36 and be exhausted through channel 37. A pivoted arm 41, mounted on the plate 26, engages the outer end of the piston 34 and in turn (Fig. 3) is engaged by the cam member 24 attached to the shaft 23 of the trip plate 25 (Fig. 2). Thus the lifting of the trip plate 25 by the passage of a piece of dough under the trip plate will cause the cam 24 to push the arm 41 and piston 34 to the right and thus operate the air valve previously described.

It will be apparent from Fig. 3 that the amount of movement of the cam 24 required for operating the air valve in the manner described can be adjusted by tilting the valve mounting plate 26 up or down, which adjustment may be accomplished by means of the screws 30 and 31. Thus, for example, if very small pieces of dough are passing through the machine and causing the trip plate 25 to be lifted only a short distance, thus producing only slight movement of the cam member 24, it may become necessary to tilt the air valve mounting plate 26 downwardly slightly from the position shown in Fig. 3 so as to cause the limited movement of the cam member 24 to produce sufficient movement of the piston 34 for properly operating the air valve.

Referring further to Fig. 3, an air cylinder 42, supported in the side wall of the machine, has a piston mounted therein which is attached to a piston rod 43. The piston rod 43 is connected at the top to an arm 44 secured to an end of the shaft 22 (see also Fig. 2) of the hinged plate 21 of the dispenser. A coil spring 45 on the piston rod 43, which is held under compression between the end of the cylinder 42 and a collar 46 secured on the piston rod, acts to hold the piston rod and piston normally in the raised position shown in Fig. 3 and thus holds the hinged plate 21 normally in the closed position indicated by the broken lines in Fig. 3. When the trip plate 25 is lifted momentarily by contact with a piece of dough, the resulting actuation of the air control valve located in the housing 13 causes compressed air to pass through the tube 40 to the cylinder 42, moving piston and piston rod 43 downwardly against the force of the spring 45 and swinging the hinged plate 21 of the dispenser momentarily into open position. This permits a piece of dough, deposited in the dispenser, to drop down into a pan beneath the dispenser. Such action will take place while the second piece of dough is passing beneath the trip plate 25. Then, as the trip plate 25 drops back to normal position, the hinged plate 21 of the dispenser also returns to normal closed position in preparation for receiving the deposit of the second piece of dough in the dispenser.

In order to halt the travel of the dough pans intermittently and hold each pan in turn momentarily in proper position below the dispenser so that the piece of dough in the dispenser can drop into a pan as desired, I provide a pair of pan-engaging elements 47 and 48 (Fig. 1) located in slots at opposite sides of the pan-moving belt 18. These pan-engaging elements 47 and 48 are identical and are identically mounted and identically operated. The position of each element longitudinally with respect to the direction of travel of the belt 18 may be adjusted separately and consequently the two elements 47 and 48 may or may not be in alignment with each other transversely, the reason for this being explained later. Since the two pan-engaging elements 47 and 48 are identical, it will suffice to describe only one of them in detail, for example element 47. This will be now done with reference to Figs. 4, 5 and 6.

The pan-engaging element 47 (Figs. 5 and 6) comprises a substantially horizontal top arm having an upwardly extending pan-engaging finger 47' at its outer end and a downwardly-extending arm 49. The pan-engaging element 47 is pivotally mounted on a horizontal stub shaft 50 which is supported in a pair of bracket lugs at the upper forward end of a carriage block which is designated as whole by the reference character 51. The carriage block 51 is slidably supported on a pair of parallel stationary horizontal rods 52 and 53. A threaded shaft 54 passes through a correspondingly threaded channel in the housing block 51 and the forward or outer end of this shaft 54 extends beyond the end of the machine housing and carries a hand knob 55 (Fig. 4) through the manipulation of which the housing block 51, and thus the pan-engaging element 47 with its finger 47' can be moved a limited distance in either direction parallel with the belt 18.

A horizontal cylindrical air chamber 56 (Fig. 5) is formed in the block 51, and a suitable piston in the chamber 56 is secured to a piston rod 57. The piston rod 57 is slidably mounted in a channel extending through the forward wall of the chamber and the outer end of the piston rod engages the bottom end of the arm 49 of pan-engaging element 47. The cylindrical chamber 56 is closed at the other end by a plug 58 and a threaded adjustable stop 59, mounted in the plug 58 limits the movement of the piston to the left as viewed in Fig. 5. A port 60 at the bottom of the cylindrical chamber 56 has a flexible tube connected with an air control valve located in housing 14 (Fig. 2). Thus the passage of air under pressure into port 60 acts to move the piston and piston rod to the right as viewed in Fig. 5 and consequently causes the finger 47' of the pan-engaging element 47 to be moved down out of engaging position with the pans on the traveling belt 18. A coil spring 61 in the cylinder chamber 56 moves the piston and piston rod back to the left when the valve control permits air to pass from the chamber 56 out through the port 60 instead of being delivered into the chamber through that port, and a light coil spring 62, preferably mounted as shown in Fig. 5, normally holds the bottom end of the arm 49 against the outer end of the piston rod 57 and thus keeps the engaging finger 47' normally in raised position, but also permitting the finger to be pressed down by any slight weight on the finger 47'.

The other pan-engaging element 48, as previously mentioned, is mounted in a similar housing block, the position of which is similarly adjustable, and which housing block is provided with a similar cylindrical air chamber and piston. The air chambers of the housing blocks of both pan-engaging elements 47 and 48 are connected by means of flexible tube 63 to an air valve control assembly located in housing 14. This air valve control assembly in housing 14 is of the same construction and is mounted in exactly the same manner as the air valve assembly in housing 13, and consequently is similarly actuated by the lifting of the trip plate 25. Thus when the trip plate 25 is raised by the passage of a piece of dough under the trip plate both pan-engaging elements 47 and 48 are momentarily pulled down out of engaging position so as to allow a pan on the belt 18 to start moving.

When only a single loaf is to be baked in each pan, thus when only one piece of dough is to be deposited in each pan, the two pan-engaging elements 47 and 48 are positioned so that they are in transverse alignment with each other and both act in unison to allow intermittent movement of a set of pans, one pan at a time. When "double" loaves are to be made, requiring two pieces of dough in each pan, one of the pan engaging elements is positioned ahead of the other as illustrated in Fig. 1. Since an important feature of my invention is the fact that it can be used in the loading of pans for "double" loaves as well as single loaves, I shall describe the operation of my pan loader briefly for "double" loaves.

Figure 4:
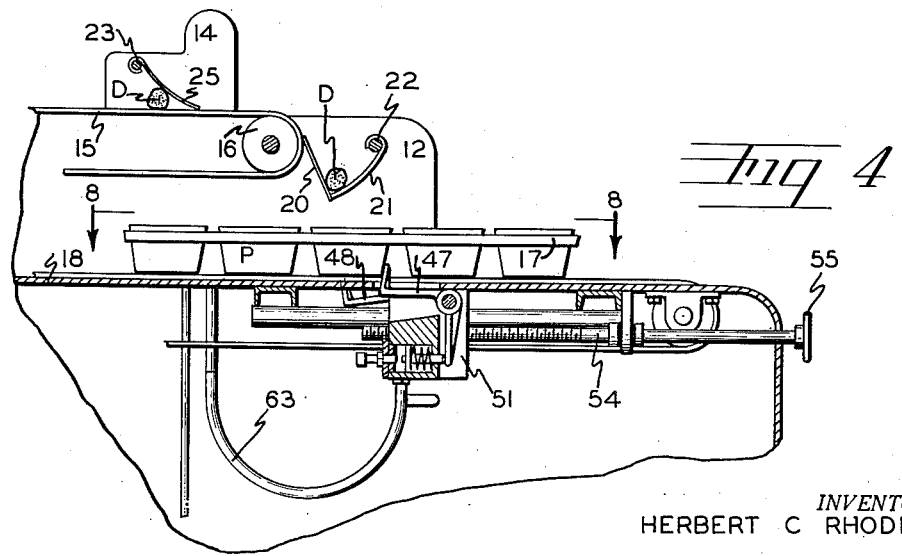
Fig. 4 is a fragmentary sectional elevation on line 4—4 of Fig. 2.

Referring to Figs. 1 and 4, both the endless belts 15 and 18, on which the pieces of molded dough and the sets of pans are carried respectively, are run without interruption. When a set of pans, however, comes into contact with the upwardly-extending finger of one of the pan-engaging elements, for example, the element 48 as viewed in Fig. 1, the travel of the pans will temporarily be halted and the belt 18 will move under the pans while the pans are held between the side guide rails 19 and blocked by the engaging element 48. When one of the molded dough pieces has been deposited in the closed trough-like dispenser and a second piece of dough engages the trip plate 25, the lifting of the trip plate by the second piece of dough causes the dispenser to open and the first mentioned piece of dough to drop into an empty pan. With the engaging element 48 properly positioned, this first piece of dough will drop into the forward half of the first pan. The lifting of the trip plate 25 will also cause the engaging elements 48 and 47 to be momentarily lowered, with the result that the pans will start moving under the frictional pull exerted by the belt 18. However, as soon as the second piece of dough has moved beyond the trip plate 25 the dispenser will close and the engaging elements 47 and 48 will be released. During this brief interval the first pan with the first piece of dough placed therein will not have moved as far as the engaging element 47 and consequently the release of the pan-engaging elements from their lowered positions will cause the second engaging element 47 now to act to block the forward movement of the pan while the other engaging element 48, being underneath the same pan, will temporarily be held down by the weight of the pan. With the pan held in the second position, the trip plate is lifted by a third piece of dough causing the second piece of dough to pass from the dispenser into its place in the rear half of the first pan; and so on.

If only a single loaf is to be baked in each pan, the pan-engaging elements are quickly adjusted into transverse alignment with each other, whereupon they both act in unison to permit the pans to move ahead one pan at a time, as previously mentioned.

In my pan loader these various adjustments are very easily and very simply taken care of and all that is required for the operation of the loader is a single suitable source of compressed air. While various modifications could be made in the individual sections and members of my loader, and it is not my intention to limit my invention otherwise than as set forth in the claims, the particular construction which I have illustrated and described I consider as the preferred form and manner for the carrying out of my invention, particularly because my pan loader when so constructed is proving highly satisfactory.

I claim:

1. In an automatic dough pan loader, the combination of a dough dispenser, a movable member in said dispenser permitting dough to drop from said dispenser when said member is moved to open position, an air-actuated piston for moving said member to open position, means for delivering pieces of dough into said dispenser, a dough-contacting trip plate extending over said delivery means and actuated by the movement of pieces of dough past said trip plate, a control operated by said trip plate, said control governing the operation of said air-actuated piston to effect movement of said member of said dispenser to open position upon engagement of said trip plate by a piece of dough, means for moving dough pans consecutively into position beneath said dispenser to receive pieces of dough discharged from said dispenser, a pan-engaging element for halting the travel of said dough pans, an air-actuated piston for moving the pan-engaging element out of pan-engaging position, and a second control operated by said trip plate governing the operation of said second mentioned piston to effect movement of said pan-engaging element out of pan-engaging position upon engagement of said trip plate by a piece of dough.

2. In a dough pan loader of the character described, a trough-like dough dispenser, a hinged plate in said dispenser permitting dough to drop from said dispenser when said plate is swung to open position, an air-actuated piston for swinging said plate to open position, spring means normally holding said plate in closed position, a conveyor belt for delivering pieces of dough into said dispenser, a dough-contacting trip plate extending over said conveyor belt and actuated by the movement of pieces of dough past said trip plate, a control operated by said trip plate, said control governing delivery of air under pressure to said air-actuated piston to effect swinging movement of said plate of said dispenser to open position upon engagement of said trip plate by a piece of dough, and means for moving dough pans consecutively into position beneath said dispenser to receive pieces of dough discharged from said dispenser.

3. In a dough pan loader of the character described, a trough-like dough dispenser, a hinged plate in said dispenser permitting dough to drop from said dispenser when said plate is swung to open position, an air-actuated piston operatively connected with said plate for swinging said plate to open position, means normally holding said plate in closed position, a conveyor belt for delivering pieces of dough into said dispenser, a dough-contacting element associated with said conveyor belt and actuated by the movement of pieces of dough past said element, an air pressure supply line leading to said air-actuated piston, a control valve interposed in said line, said valve normally connecting said air-actuated piston to exhaust and being operative in response to movement of said dough contacting element, upon said element being engaged by a piece of dough, to admit air under pressure to said air-actuated piston to effect swinging movement of said plate of said dispenser to open position, and a second conveyor belt located below said dispenser and said dough conveyor belt for moving dough pans beneath said dispenser.

4. In a dough pan loader of the character described, a conveyor belt for delivering pieces of dough, a dough-contacting trip plate extending over said conveyor belt and actuated by the movement of pieces of dough past said trip plate, pan conveying means located below said dough conveyor belt for moving dough pans, a pair of pan-engaging elements located adjacent said pan conveying means for halting the travel of said dough pans with said pan conveying means, each of said pan-engaging elements mounted in a movable carriage, means for adjustably moving each of said carriages independently and in a direction parallel to the direction of travel of said pan conveying means, an air-actuated piston supported in each of said carriages operatively connected with a respective pan-engaging element for moving the pan-engaging element out of pan-engaging position, an air pressure supply line having a connection with each of said air actuated pistons, and a control valve interposed in said line, said valve being operative in response to movement of said trip plate, upon said trip plate being engaged by a piece of dough, to admit air under pressure to said air-actuated piston to effect movement of said pan-engaging elements out of pan-engaging position.

5. In a dough pan loader of the character described, a conveyor belt for delivering pieces of dough, a dough-contacting trip plate extending over said conveyor belt and actuated by the movement of pieces of dough past said trip, a second conveyor belt located below said dough conveyor belt for moving dough pans, a pair of pan-engaging elements located adjacent said pan conveyor belt for halting the travel of said dough pans with said pan conveyor belt, each of said pan-engaging elements mounted in a movable carriage, means for adjustably moving each of said carriages independently and in a direction parallel to the direction of travel of said pan conveyor belt, an air-actuated piston in each of said carriages for moving the pan-engaging element out of pan-engaging position, a spring in each carriage acting to raise the pan-engaging element into engaging position, and a control valve operated by said trip plate governing the operation of said air-actuated pistons in said carriages, whereby the engagement of said trip plate by a piece of dough will cause said pan-engaging elements to be moved out of pan-engaging position for the reason described.

6. An automatic dough pan loader of the character described including a trough-like dough dispenser, a hinged member in said dispenser permitting dough to drop from said dispenser when said member is swung to open position, a conveyor belt for delivering pieces of dough into said dispenser, a dough-contacting trip plate extending over said conveyor belt and actuated by the movement of pieces of dough past said trip plate, dispenser operating means connecting said trip plate and said hinged member of said dispenser and causing said dispenser member to be swung to open position whenever said trip plate is lifted by contact with a moving piece of dough on said conveyor belt, a second conveyor belt for moving dough pans beneath said dispenser, a pair of pan-engaging elements located adjacent said pan conveyor belt for halting the travel of said dough pans with said pan conveyor belt, air-actuated pistons for moving the pan-engaging elements out of pan-engaging position, and a control operated by said trip plate governing the operation of said air-actuated pistons to effect movement of said pan-engaging elements out of pan engaging position upon engagement of said trip plate by a piece of dough.

7. An automatic dough pan loader of the character described comprising a trough-like dough dispenser, a hinged plate in said dispenser permitting dough to drop from said dispenser when said plate is swung to open position, an air-actuated piston for swinging said plate to open position, spring means normally holding said plate in closed position, a conveyor belt for delivering pieces of dough into said dispenser, a dough-contacting trip plate extending over said conveyor belt and actuated by the movement of pieces of dough past said trip plate, an air control valve operated by said trip plate, said air control valve governing the operation of said air-actuated piston, whereby the engagement of said trip plate by a piece of dough will cause said plate of said dispenser to swing to open position, a second conveyor belt located below and said dispenser and said dough conveyor belt for moving dough pans beneath said dispenser, a pair of pan-engaging elements located adjacent said pan conveyor belt for halting the travel of said dough pans with said pan conveyor belt, each of said pan-engaging elements mounted in a movable carriage, means for adjustably moving each of said carriages independently and in a direction parallel to the direction of travel of said pan conveyor belt, an air-actuated piston in each of said carriages for moving the pan-engaging elements out of pan-engaging position, a spring in each carriage acting to raise the pan-engaging element into engaging position, and a second control valve operated by said trip plate governing the operation of said air-actuated pistons in said carriages, whereby the engagement of said trip plate by a piece of dough will also cause said pan-engaging elements to be moved out of pan-engaging position for the reason described.

HERBERT C. RHODES.

REFERENCES CITED

The following references are of record in the file of this patent:

UNITED STATES PATENTS

| Number | Name | Date |
| --- | --- | --- |
| 1,781,546 | Harber | Nov. 11, 1930 |
| 1,871,216 | Kirschhoff | Aug. 9, 1932 |
| 2,349,423 | Harber | May 23, 1944 |